Figure 1:
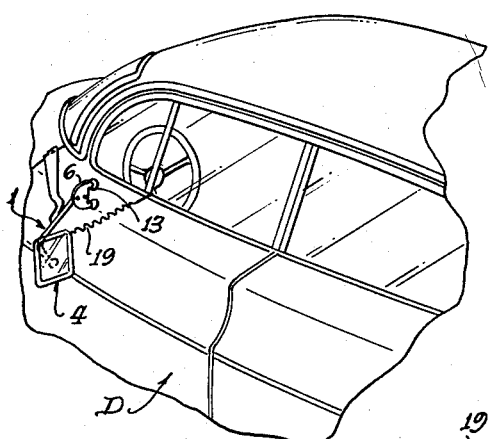

Jan. 19, 1965   V. E. FARNSWORTH   3,166,283
QUICK-DETACHABLE REAR VIEW MIRROR
Filed Nov. 21, 1963

VAUN E. FARNSWORTH,
INVENTOR.

BY
Harold J. Wescoule
ATTORNEY.

3,166,283
QUICK-DETACHABLE REAR VIEW MIRROR
Vaun E. Farnsworth, 624 Glenwood Road,
Glendale 2, Calif.
Filed Nov. 21, 1963, Ser. No. 325,268
10 Claims. (Cl. 248—226)

This invention relates to quick detachable rear view mirrors for motor vehicles of the type required for safe driving when the vehicle is towing a house trailer or other equally wide vehicle. As set forth in my prior Patent No. 3,081,057, dated March 31, 1963, the ordinary side mounted rear view mirror is set too closely to the car body to give an angle of view that will extend to the rear of a house trailer, wherefore, a side mounted rear view mirror mounted on a longer lateral arm is required while a house tailer is being towed. Such a mirror is not required and is, in fact, dangerous when not required. Moreover, as is well known, the closer the mirror is to the eye of the driver, the greater the field of view that can be seen. For this reason it has been found highly desirable to mount these detachable rear view mirrors on the front door of the vehicle. This does not mean that a mirror mounted on the hood of a vehicle is useless but merely that most drivers now prefer a door mounted mirror for this particular reason.

The embodiment of my said prior invention shown in FIGS. 6–10 of my said patent was adapted to hook over a portion of a door that extended beneath a so-called "wrap-around" windshield and be supported in place by a brace leg component engaging the car door below the point which it was hooked on the edge of the door, such support opposing the weight of the mirror. Recent developments in body design of motor cars have eliminated the curved or "wrap around" windshield and thus have destroyed the opportunity to support a quick detachable rear view mirror by its own weight at a point on a door bringing the mirror to a position in which it is useful to the driver. The need for a mirror that will perform the same service as my said prior mirror still exists.

With this need in mind, it is the principal object of the invention to provide a quick detachable, long arm, rear view mirror that is hooked over the front edge of an automobile door and is provided with a brace leg means together with spring means for holding it in position on the side of the vehicle.

Another object of the invention is to provide a mirror of the above character which is simple in design, economical to manufacture, is readily attached and detached from a vehicle door without injury to the surface thereof and which is reliable for its intended purpose particularly having regard for the vibration and other movements imparted to the vehicle body incident to travel.

Still another object of the invention is to provide a rear view mirror of the foregoing character in which the wind resistance of the mirror incident to movement of the vehicle serves, further, to hold the mirror in position on the vehicle.

Figure 2:
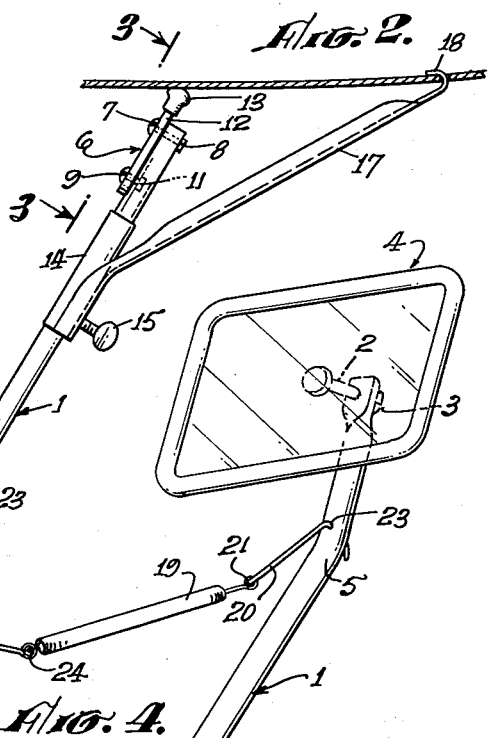
Figure 3:
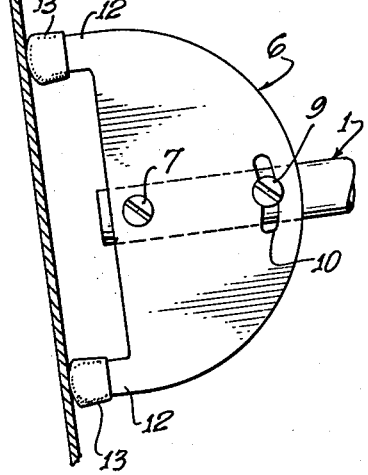
Figure 4:
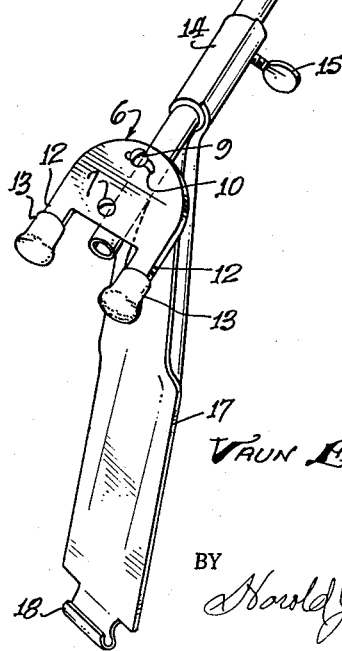

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a fragmentary perspective view of the exterior of a motor vehicle adjacent the side thereof occupied by the driver and showing a rear view mirror embodying the present invention fixed to the door of the vehicle, FIG. 2 is an enlarged scale, top plan view of the mounted mirror, FIG. 3 is a further enlarged side elevational view of the rocking pad or foot element on the main bracket arm component of the illustrated embodiment of the invention, and FIG. 4 is a perspective view of the mirror as detached from the vehicle preparatory to being attached thereto or to be stored for further use.

Referring to the drawings, the illustrated embodiment of the invention comprises a mirror supporting bracket arm 1 preferably formed from tubular material having one end thereof flattened and perforated to receive one end of the stud 2 secured thereto by a nut 3, the other end of said stud carrying a mirror 4 mounted thereon by means affording angular adjustment of the mirror relative to said stud.

Adjacent said one end thereof, the bracket arm 1 may be slightly bent as at 5 to position the stud 2 so that the mirror carried thereby may be positioned at a desired angle to accommodate the driver of the vehicle. The other end of said bracket arm carries a foot element 6 pivotally mounted thereon by a bolt 7 and nut 8 which are positioned in substantially the same plane as the axis of the stud 2. A second screw 9 extends through an arcuate slot 10 in the foot element generated about the axis of the bolt 7 and said second screw is secured by a nut 11 within the bracket arm and is effective to secure the foot element in a desired position of angular adjustment within the limits imposed by the slot 10. The foot element 6 is provided with a pair of foot ends 12, 12 laterally spaced from each other and covered by rubber pad elements 13, 13 which engage the surface of the car doors as shown in FIGS. 1 and 2 while protecting the surface thus engaged.

Slidably mounted on the portion of the bracket arm 1 extending from the bend 5 to the foot element 6 is a sleeve 14 carrying a radially disposed thumb screw 15 operable to clamp the sleeve to the bracket in any desired position rotatably or axially of said portion of the bracket arm 1. This sleeve has one end of a hook bracket member 17 attached thereto, said hook bracket member extending therefrom at an acute angle relative to the axial line of said sleeve and in a direction away from the opposite or mirror carrying end of the bracket arm. This hook bracket member terminates at the end thereof remote from the sleeve in a hook 18 adapted to engage the forward edge of a car door.

The assembly is completed by a tension spring means comprising a tension coil spring 19 having one end of a hook 20 attached to an eye member 21 of the spring and having the other end of said hook extending into a hole 23 extending through the bracket arm 1 adjacent the bend 5 therein. The other end of the spring 19 is secured to the eye 24 of a hook 25 adapted to be inserted in the window slot of the front door of the car immediately in rear of the wind wing pillar or hooked over the pillar itself. The length of the spring means comprising the spring 19 and hooks 20 and 25 is such that when thus installed, the spring 19 will be stretched sufficiently to provide an appreciable bias on the rest of the assembly.

Referring now to FIG. 1 it will be noted that the tension of the spring 19 tends to rock the bracket arm 1 about the foot element 6 as a fulcrum and is opposed by the engagement of the hook 18 with the edge of the car door. The tension of the spring is sufficient so that the ordinary opening and shutting of the door will not dislodge the mirror therefrom. At the same time, when it is not required the mirror can be quickly removed by simply disengaging the hook 25 from the car door and this, in turn, releases any tight engagement with the car door by the hook 18. The adjustment of the hook arm and sleeve along the bracket arm permits the accommodation of the hook to either a directly vertical portion of the door ledge or one which may extend at an angle to the vertical as shown in FIG. 1 and the adjustment of this element lengthwise of the bracket arm 1 effects a change of angle in the attitude of the bracket arm 1. After the position of the sleeve along the bracket arm has been determined and fixed by the thumb screw and the angular position of the foot member 6 has been secured by tightening the screw 9, the device is ready for quick attachment to and removal from the car for which it has been thus adjusted. It is obvious that the device may be thus mounted at either or both sides of the car.

While in the foregoing specification there has been disclosed a presently preferred embodiment of the invention, it is not to be inferred therefrom that the invention is in fact limited to the specific details of construction thus disclosed by way of example and it will be understood that the invention includes as well all such changes and modifications in the parts and in the construction, combination and arrangement of parts as shall come within the purview of the appended claims.

I claim:

1. A rear view mirror mounting means capable of quick attachment to and removal from a motor vehicle front door; said mounting means comprising, an elongated bracket arm carrying a mirror at one end thereof and a foot element at the other end thereof adapted to engage and rest on the side surface of a vehicle front door, a hook adapted to engage the front edge of a vehicle front door, means connecting said hook to said bracket arm at a point thereon outwardly from said foot element, and spring means having one end thereof attached to said bracket arm and having the other end thereof adapted for detachable engagement with a rearwardly facing component of the vehicle door disposed rearwardly of the point of engagement of a vehicle door by said foot element and effective to apply a bias tending to rock said bracket arm about the point of engagement of a vehicle door by said foot element as a fulcrum with resultant tension on said means connecting said hook to said bracket arm with resultant clamping of said mounting means on a vehicle door.

2. A rear view mirror mounting means as claimed in claim 1 in which said means connecting said hook to said bracket arm includes a sleeve element freely slidable on said bracket arm and carrying said hook and screw-threaded means associated with said sleeve operable to releasably secure said sleeve to said bracket arm in a desired position of longitudinal adjustment thereon.

3. A rear view mirror mounting means as claimed in claim 1 in which one end of said spring means is attached to said bracket arm outwardly of the point of attachment of said hook connecting means to said bracket arm, and in which the other end of said spring means is provided with a second hook adapted to engage a portion of the window structure of a vehicle door.

4. A rear view mirror mounting means as claimed in claim 1 in which said foot element is angularly adjustable on said bracket arm to conform to varying contours of the sides of vehicle front doors.

5. A rear view mounting means as claimed in claim 4 in which said foot element is pivotally mounted on said bracket arm for movement about an axis normal to the longitudinal dimension of said bracket arm and is provided with a pair of resilient pads engaging a vehicle door surface at each side of said pivotal mounting.

6. In a rear view mirror mounting means, an elongated, rigid bracket means having means at one end thereof for attachment of a mirror thereto and having a foot element at the other end thereof adapted to engage the side surface of a motor vehicle front door panel, and means for removably securing said bracket arm means on a motor vehicle front door comprising a pair of hook elements and a tension spring; one of said hook elements having a hooked end adapted to engage the leading edge of a motor vehicle front door panel and having the opposite end thereof secured to said bracket arm means and the other of said hook elements having a hook portion at one end thereof adapted to engage a rearwardly facing surface of a motor vehicle door disposed rearwardly of the point of engagement by said foot element and said tension spring being interposed in stretched condition between said other of said hook elements and said bracket arm means and, by reason of the bias created by being stretched, being operative in cooperation with said one hook element and said foot element to hold said bracket arm mounted on a motor vehicle door.

7. A rear view mirror mounting means capable of quick attachment to and removal from a motor vehicle front door; said mounting means comprising a rigid elongated bracket arm carrying a mirror at one end thereof and having door engaging means at the other end thereof including a hook means adapted to be engaged with a generally vertically extending front edge of a vehicle door and other means contacting a vehicle door surface at a plurality of points disposed in spaced vertical relation to one another, and an extended tension spring means connected to a point on said bracket arm outwardly of said door engaging means carried by said arm and adapted to extend to a rearwardly facing component of a vehicle door, the tension of said spring means being effective to tend to rock said bracket arm about a fulcrum comprising the points of engagement of said other door surface engaging means with a door surface in opposition to the resistance of said hook means and the engagement thereof with a door edge with resultant releasable clamping of said mounting means on a vehicle door.

8. A rear view mirror mounting means as claimed in claim 7 in which said hook means and said other means for engaging a door surface are relatively rotatably adjustable about the longitudinal axial line of said bracket arm.

9. A rear view mirror mounting means as claimed in claim 7 in which said door engaging hook means and said other means for engaging a door surface are relatively adjustable longitudinally of said bracket arm.

10. A rear view mirror mounting means as claimed in claim 7 in which said door edge engaging means and said door surface engaging means are relatively adjustable both rotatably about the longitudinal axial line of said bracket arm and longitudinally thereof.

References Cited by the Examiner
UNITED STATES PATENTS

| | | | |
|---|---|---|---|
| 2,024,468 | 12/35 | McGinley | 108—48 |
| 2,518,538 | 8/50 | Giblin | 248—226 X |
| 3,081,057 | 3/63 | Farnsworth | 248—226 |
| 3,114,530 | 12/63 | Shilling | 248—226 |

CLAUDE A. LE ROY, *Primary Examiner.*